No. 837,441. PATENTED DEC. 4, 1906.
O. E. WHITE.
GRAIN DRILL.
APPLICATION FILED APR. 8, 1905.
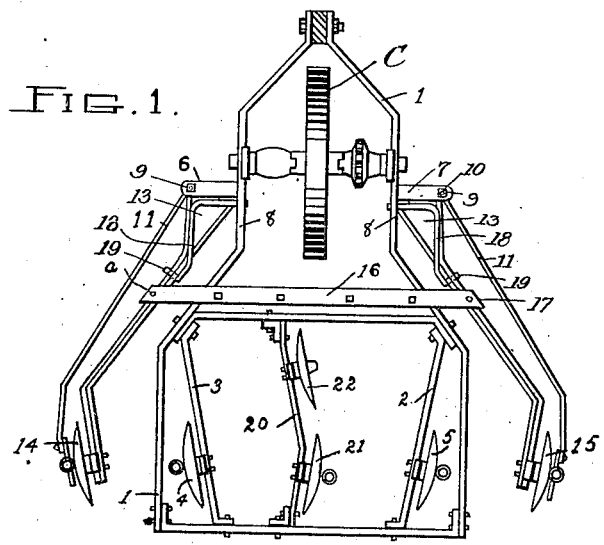
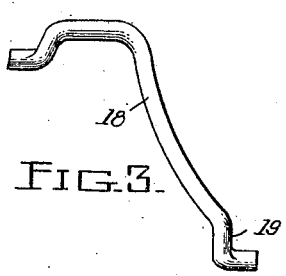
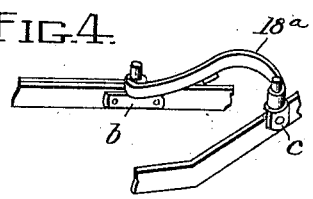
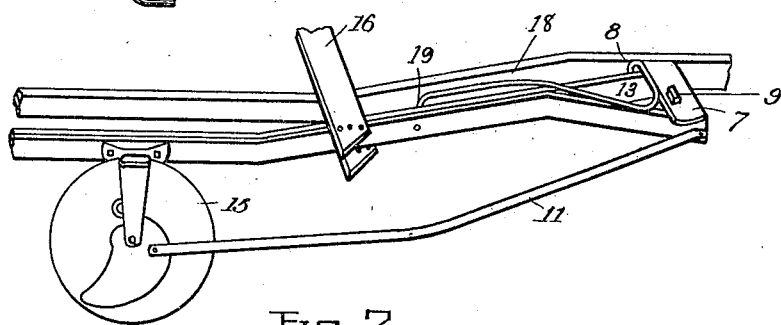
Witnesses
Fred A. Schlosser.
Calvin Keith.
Inventor
Omer E. White
By John H. Boss
Attorney

UNITED STATES PATENT OFFICE.

OMER E. WHITE, OF CAMBRIDGE CITY, INDIANA, ASSIGNOR TO THE NATIONAL DRILL COMPANY, OF CAMBRIDGE CITY, INDIANA, A CORPORATION.

GRAIN-DRILL.

No. 837,441.    Specification of Letters Patent.    Patented Dec. 4, 1906.

Application filed April 8, 1905.  Serial No. 254,434.

*To all whom it may concern:*

Be it known that I, OMER E. WHITE, a citizen of the United States of America, and a resident of Cambridge City, Wayne county, Indiana, have invented certain new and useful Improvements in Grain-Drills, of which the following is a specification.

My invention relates to grain-drills having disks or rotary colters journaled in suitable bearings on a frame and used for the purpose of planting seed in the ground without requiring plowing of land.

The objects are to construct a drill which will open furrows in the ground for ordinary seed-planting and means for attaching an auxiliary rotary disk on the frame for the purpose of breaking and pulverizing the hard ridge which usually exists between the rows, thereby equalizing the condition of the soil preparatory to planting the seed through the medium of the ordinary disks and appliances.

A further object is to provide a means of attaching the auxiliary disk to the frame in front of the ordinary center disk to afford facilities for forming a furrow in the soil in advance, counteracting the resistance of the soil caused by the hard ridge formed between the rows, partially forming a center furrow, and guiding the center disk, which in conjunction with the auxiliary disk uniformly regulates the travel and overcomes the tendency of the drill to shift to either side.

A further object of my invention is to secure a pivotal bar or wing on each side of the frame in such a manner as to keep the bars under spring tension, affording a means of carrying the disks secured thereto out to the row in case the soil is not heavy enough to sustain the weight. The spring counterbalances the inclination of the wings to travel toward the center of the row while in operation.

I attain these and other objects by the mechanism illustrated in the accompanying drawings, in which—

Figure 1 is a top plan view showing construction of frame with wing, disk, and spring attached. Fig. 2 is a side view of part of the frame and pivotal bar, showing the application of the spring thereto. Fig. 3 is a detail view of the spring; and Fig. 4 shows broken sections of part of the frame and wing-bar, flat spring, and means of attachment.

Similar letters and figures of reference represent similar parts throughout the several views.

The frame 1 is preferably made to conform to the shape shown in Fig. 1 of the drawings. Drag-bars 2 and 3 are secured to the frame at an angle with the line of draft. Suitable bearings are attached to the bars 2 and 3, on which the disks 4 and 5 are journaled at reverse angles to each other. Brackets 6 and 7 are attached to the frame at front end 8. The bolts 9 pass through suitable apertures 10 in the brackets.

Wings or pivotal bars 11, constructed, preferably, of double bars having their free ends closed and rigidly secured together, leaving an eye or loop 13 formed on one end, are adapted to be pivotally connected to the frame by the bolt 9, which passes through the looped end. This pivotal connection gives the wings the required lateral motion. Disks 14 and 15 are journaled in suitable bearings attached to the free ends of the wings at reverse angles to each other. A cross-bar 16, having apertures 17 formed in the projecting ends, is attached to the frame for the purpose of regulating the lateral movement or travel of the wings by inserting a pin $a$ in the apertures, which contacts with the wings or pivotal bars. A spring 18 is securely attached to the frame, so as to leave its free end 19 exerting a pressure against the pivotal bars or wings 11, forcing them to travel outward to their proper position irrespective of the condition of the soil. A flat spring $18^a$, similar to the one shown, can be used, if desired, without deviating from the principle involved in the application of the round spring. When the flat spring is used, it can be attached, as shown, by means of the brackets $b$ and $c$. (See Fig. 4.) A central drag-bar 20 is attached to the center of the frame by means of suitable brackets and bolts, as shown. To the rear end of the bar 20 a suitable bearing is attached, on which the disk 21 is journaled. It will be noted that the disks 5, 15, and 21 are journaled on the frame at reverse angles to the disks 4 and 14, making the draft of the drill unequal or excessive on the side that carries the largest number of disks.

In order to obviate the side shift of the drill caused by the excessive draft, I attach an auxiliary disk 22 on the bar 20 in front of the disk 21 at a reverse angle corresponding with the disks 4 and 14, thereby equalizing the draft and providing means for guiding the drill in proper alinement. I prefer to journal the disks on the central drag-bar in such a manner as to leave their cutting edges in approximate alinement with each other, as shown in the drawings. The rear disk 21 cuts a portion of the furrow formed by the disk 22, depositing the soil in the furrow and covering the seed.

The construction of the central drag-bar is such that the auxiliary disk 22 performs the function of a leader or guide for the disks traveling in the rear, partially opening the central furrow in combination with the rear central disk 21. A double, single, or sectional bar for mounting the center disks can be used in the construction of my device without departing from the principle involved in my invention.

Reference-letter C designates the pilot-wheel.

Having fully described my invention, what I claim, and desire to secure by Letters Patent, is—

1. A drill comprising a frame having a series of disks journaled thereon, a bar secured to the central portion of said frame carrying an auxiliary disk in advance of the series, wing-bars pivotally secured to the frame, a cross-bar attached to the top of the frame, springs attached to the frame and the wing-bars to provide for lateral movement of said bars under tension.

2. The combination of a frame with series of disks journaled thereon in approximate alinement with each other and at an angle to the line of draft, a central angular bar secured to said frame having one of said series journaled thereon, an auxiliary disk journaled on said central angular bar in advance of said series, wings pivotally connected to the frame carrying two of said series of disks; said wings having lateral movement, springs to control the lateral movement of the wings.

3. The combination of a frame having series of disks journaled thereon substantially in alinement with each other, an angular bar secured to the central portion of said frame, an auxiliary disk journaled to said bar in advance of said series, wing-bars pivotally secured to the frame, springs attached to the wing-bars and frame to provide for lateral movement of the wing-bars under spring tension.

4. In a drill the combination of a frame having a series of disks journaled thereon substantially in alinement with each other, a central bar having an auxiliary disk journaled on said bar in advance of said series, brackets secured to each side of the frame, wing-bars having their ends looped and pivotally connected to said brackets, springs attached to the frame and wing-bars to permit lateral movement under tension.

5. The combination of a drill having wing-bars pivotally attached thereto carrying disks, disks journaled on the frame in approximate alinement with the disks on the wing-bars, a central bar having an auxiliary disk journaled thereon in advance of said disks, a cross-bar secured to the top of the frame having apertures therein, pins adapted to be inserted in said apertures to limit the outward throw of the wing-bars, springs attached to the frame and wing-bars to permit lateral movement under tension.

Signed at Cambridge City, Indiana, this 3d day of April, 1905.

OMER E. WHITE.

Witnesses:
FRANK A. OSBORN,
JACOB GRIESINGER.